(12) United States Patent
Berthelot et al.

(10) Patent No.: US 8,691,469 B2
(45) Date of Patent: Apr. 8, 2014

(54) PROTON CONDUCTING MEMBRANES FOR FUEL CELLS HAVING A PROTON GRADIENT AND METHODS FOR PREPARING SAID MEMBRANES

(75) Inventors: Thomas Berthelot, Vellebon sur Yvette (FR); Marie-Claude Clochard, Sartrouville (FR)

(73) Assignee: Commissariat a l'Energie Atomique, Paris (FR)

( * ) Notice: Subject to any disclaimer, the term of this patent is extended or adjusted under 35 U.S.C. 154(b) by 768 days.

(21) Appl. No.: 12/679,298

(22) PCT Filed: Sep. 24, 2008

(86) PCT No.: PCT/EP2008/062726
§ 371 (c)(1),
(2), (4) Date: Mar. 19, 2010

(87) PCT Pub. No.: WO2009/040362
PCT Pub. Date: Apr. 2, 2009

(65) Prior Publication Data
US 2010/0304273 A1 Dec. 2, 2010

(30) Foreign Application Priority Data

Sep. 26, 2007 (FR) ...................... 07 57873

(51) Int. Cl.
*H01M 8/10* (2006.01)
(52) U.S. Cl.
USPC ............... 429/493; 429/492; 521/25; 521/27
(58) Field of Classification Search
USPC ............................. 429/493, 492; 521/27, 25
See application file for complete search history.

(56) References Cited

U.S. PATENT DOCUMENTS

| 6,258,271 | B1 | | 7/2001 | Jitariouk et al. | |
|---|---|---|---|---|---|
| 8,017,659 | B2 | * | 9/2011 | Endo et al. | 521/25 |
| 2004/0053060 | A1 | * | 3/2004 | Roziere et al. | 428/447 |
| 2007/0197409 | A1 | * | 8/2007 | Scherer et al. | 508/469 |
| 2010/0239946 | A1 | * | 9/2010 | Miyachi et al. | 429/483 |
| 2010/0311860 | A1 | * | 12/2010 | Berthelot et al. | 522/136 |

FOREIGN PATENT DOCUMENTS

| EP | 0140544 | A | | 5/1985 |
|---|---|---|---|---|
| EP | 140544 | A2 | * | 5/1985 |
| EP | 1662594 | A | | 5/2006 |
| EP | 1662594 | A1 | * | 5/2006 |
| FR | 2770150 | A1 | | 4/1999 |
| JP | 04016219 | A | | 1/1992 |
| JP | 08-290066 | | * | 11/1996 |
| JP | 08290066 | A | | 11/1996 |
| JP | 2003-242996 | | * | 8/2003 |
| JP | 2003242996 | A | | 8/2003 |
| JP | 2005-029655 | | * | 2/2005 |
| JP | 2005029655 | A | | 2/2005 |
| WO | 9924497 | A | | 5/1999 |
| WO | 0031750 | A | | 6/2000 |
| WO | 0112699 | A | | 2/2001 |
| WO | 02082562 | A | | 10/2002 |

OTHER PUBLICATIONS

French Preliminary Search Report in French Application No. FR 0757873, dated Jun. 17, 2008.
International Search Report in International Application No. PCT/EP2008/062726, mailed Nov. 18, 2008.
Ulbricht et al., "Advanced Functional Polymer Membranes," Polymer, Elsevier Science Publisher B.V. GB, Col. 47, No. 7, Mar. 22, 2006, pp. 2217-2262.

* cited by examiner

*Primary Examiner* — Peter D. Mulcahy
*Assistant Examiner* — Henry Hu
(74) *Attorney, Agent, or Firm* — Nixon Peabody LLP

(57) ABSTRACT

A proton exchange membrane for a fuel cell, comprising a graft (co)polymer comprising a main chain and grafts comprising at least one proton acceptor group and at least one proton donor group.

29 Claims, No Drawings

PROTON CONDUCTING MEMBRANES FOR FUEL CELLS HAVING A PROTON GRADIENT AND METHODS FOR PREPARING SAID MEMBRANES

CROSS REFERENCE TO RELATED APPLICATIONS OR PRIORITY CLAIM

This application is a national phase of International Application No. PCT/EP2008/062726, entitled, "Proton Conducting Membranes For Fuel Cells Having A Proton Gradient And Method For Preparing Said Membranes", which was filed on Sep. 24, 2008, and which claims priority of French Patent Application No. 07 57873, filed Sep. 26, 2007.

TECHNICAL FIELD

The invention relates to proton-conducting membranes for a fuel cell that exhibit a proton gradient, to methods for fabricating these membranes, and to fuel cell devices comprising this type of membrane.

The field of application of the invention is therefore that of fuel cells, and more particularly of fuel cells comprising as electrolyte a proton-conducting membrane, such as PEMFC fuel cells (Proton Exchange Membrane Fuel Cells).

BACKGROUND ART

A fuel cell comprises, in general, a stack of individual cells within which an electrochemical reaction takes place between two, continuously introduced reactants. The fuel, such as hydrogen for fuel cells operating with hydrogen/oxygen mixtures, or methanol for fuel cells operating with methanol/oxygen mixtures, is brought into contact with the anode, while the oxidant, generally oxygen, is brought into contact with the cathode. The anode and cathode are separated by an electrolyte in the form of an ion-conducting membrane. The electrochemical reaction, the energy from which is converted into electrical energy, is broken down into two half-reactions:
  oxidation of the fuel, taking place at the anode/electrolyte interface and producing, in the case of hydrogen fuel cells, protons H+, which will pass through the electrolyte in the direction of the cathode, and electrons, which rejoin the external circuit, so as to contribute to the production of electrical energy;
  reduction of the oxidant, which takes place at the electrolyte/cathode interface, with production of water, in the case of hydrogen fuel cells.

The electrochemical reaction takes place, properly speaking, within a membrane electrode assembly.

The membrane electrode assembly is a very thin assembly, with a thickness on the millimetre scale, and each electrode is supplied with the gases, for example, by means of a corrugated plate.

The ion-conducting membrane is generally an organic membrane containing ionic groups which, in the presence of water, allow conduction of the protons produced at the anode by oxidation of the hydrogen.

The thickness of this membrane is generally between 50 and 150 μm and is the result of a trade-off between mechanical strength and ohmic loss. This membrane also allows separation of the gases. The chemical and electrochemical resistance of these membranes allows them in general to operate in the fuel cell for durations of more than 1000 hours.

The polymer making up the membrane must therefore fulfil a certain number of conditions in relation to its mechanical, physicochemical and electrical properties, including the conditions defined below.

The polymer must first of all be able to give thin films, of 50 to 150 micrometres, which are dense and defect-free. The mechanical properties, modulus of elasticity, breaking stress and ductility, must make the polymer compatible with the assembly operations, including, for example, an operation of clamping between metal frames.

The properties must be retained on passing from the dry state to the wet state.

The polymer must have high thermal stability to hydrolysis and must exhibit high resistance to reduction and to oxidation. This thermomechanical stability is assessed in terms of variation in ionic resistance, and in terms of variation in mechanical properties.

The polymer must, lastly, possess a high ion conductivity, this conductivity being provided by acid groups, such as carboxylic acid, phosphoric acid or sulphonic acid groups, which are bonded to the chain of the polymer.

For a number of decades, different types of proton-conducting polymers have been proposed that can be used for constituting fuel-cell membranes.

Employed first of all were sulphonated phenolic resins prepared by sulphonating polycondensed products, such as phenol-formaldehyde polymers.

The membranes prepared with these products are inexpensive, but lack sufficient stability to hydrogen at 50-60° C. for long-term applications.

Attention then turned to sulphonated polystyrene derivatives, whose stability is greater than that of the sulphonated phenolic resins, but which cannot be used at more than 50-60° C.

At present, acceptable performance properties are obtained on the basis of polymers composed of a perfluorinated linear main chain and a side chain that bears a sulphonic acid group.

Among these best-known polymers, which are available commercially, mention may be made of the polymers registered under the Nafion® brand names from the company Du Pont de Nemours.

However, the membranes used at present, and especially the Nafion® membranes, have a service temperature limit of the order of 90° C., exhibit a phenomenon of ageing after 3000-4000 hours of service, and, lastly, possess inadequate proton conduction.

The problem addressed by the inventors was therefore that of providing membranes which eliminate the aforementioned drawbacks, and, more particularly, membranes which exhibit better proton conduction than the existing membranes such as the Nafion® membranes.

SUMMARY OF THE INVENTION

Accordingly, the inventors have provided proton-conducting membranes based on graft (co)polymers comprising particular grafts, the functional features of these graft (co)polymers contributing to the creation of a proton gradient, which generates a motive force for the circulation of protons within the membrane, such membranes being particularly suitable for fuel cells.

The invention accordingly provides a proton-conducting membrane for a fuel cell, comprising a graft (co)polymer comprising a main chain and grafts bonded covalently to said main chain, said grafts comprising at least one proton acceptor group and at least one proton donor group.

Owing to the presence on the grafts of at least one proton acceptor group and at least one proton donor group, there is proton exchange between these two groups and, consequently, a motive force which boosts the circulation of protons within the membrane, thus leading to better proton conduction.

Before going into more detail in the description of the invention, we propose the following definitions.

A (co)polymer is a polymer comprising the same repeating units or a copolymer comprising different repeating units.

A graft is a side chain bonded covalently to the main chain of the (co)polymer, said graft comprising both a proton acceptor group and a proton donor group.

A proton acceptor group is a group capable of attaching a proton, this attachment coming about through the sharing of a lone pair of an atom of said group with the proton, or else through electrostatic attraction with a negatively charged group. In other words, the proton acceptor group contains an atom bearing a lone pair and/or is negatively charged. From the chemical standpoint, groups bearing proton-accepting lone pairs may be amine groups, such as primary amine groups (—$NH_2$) or secondary amine groups (—NH—), which are included in a linear hydrocarbon chain or contained in an imidazole or guanidine group. Negatively charged proton acceptor groups may be salts of carboxylic acid —$CO_2H$, sulphonic acid —$SO_3H$ and phosphonic acid —$PO_3H_2$ functions, or —$O^-$ or $S^-$ functions.

A proton donor group is a group capable of undergoing dissociation with release of a proton. From a chemical standpoint, these groups may be an acid group —$CO_2H$, —$SO_3H$ or —$PO_3H_2$, an —OH or —SH group, a salt of amine group, such as a primary amine (—$NH_2$) or secondary amine (—NH—) salt contained in a linear hydrocarbon chain or contained in a group such as an imidazole or guanidine group.

Without being bound at all by the theory, the proton acceptor groups and proton donor groups are, respectively, the members of a conjugate acid/base pair, characterized by a pK (dissociation constant) value in water. On a given graft, according to the invention, the proton acceptor group will be present in a basic form, whereas the proton donor group will be present in an acidic form, which means, in terms of pK values, that the pK of the proton acceptor group will be less than the pK of the proton donor group.

Generally speaking, the pK value in water for a proton acceptor group ranges from −15 to 6 (preferably, from 3 to 5), whereas the pK value in water for a proton donor group ranges from 8 to 15 (preferably, from 8 to 11). Advantageously, the difference between the pK value of the donor group and the pK value of the acceptor group is at least 0.5 and typically 5. This difference is manifested in a transfer of protons from the proton donor group to the proton acceptor group, thereby producing a proton gradient.

The aforementioned grafts may correspond to a saturated or unsaturated, cyclic or acyclic hydrocarbon group which may contain one or more heteroatoms such as O, N and S and is optionally substituted, such as by halogen atoms, fluorine for instance, subject to the proviso that said hydrocarbon group contains both at least one proton acceptor group and at least one proton donor group.

For example, the grafts may correspond to an aliphatic hydrocarbon group, such as an alkyl group, containing advantageously 1 to 22 carbon atoms, preferably 6 to 16 carbon atoms, which is optionally substituted by one or more fluorine atoms. Inserted within this chain there may be one or more oxygen atoms —O—, in which case the chain may be referred to as a polyether chain.

The grafts may also correspond to an aromatic hydrocarbon group comprising one or more aromatic rings, optionally containing one or more heteroatoms such as O, N and S (in which case, the chain may be referred to as a heterocyclic chain).

The grafts may comprise at least one group of amide linkages of formula —NHCO—.

It is well understood that, in all of the cases in point, the grafts also contain both at least one proton acceptor group and at least one proton donor group.

Particular grafts in accordance with the invention may be amino acid residues or peptide sequences.

An amino acid, conventionally, is a hydrocarbon compound containing both an organic acid function and an amine function, the best-known representatives being the natural α-amino acids (which bear a carboxyl function —$CO_2H$ and an amine function —$NH_2$). They may also be amino acids bearing a function analogous to the carboxyl function (for example —$SO_3H$, —$PO_3H_2$), and bearing an amine function —$NH_2$.

An amino acid residue is the amino acid residue resulting from the reaction of an —$NH_2$ function of the amino acid with a carboxyl or analogous function of another compound, to form an amide linkage (the other compound being, presently, in our case in point, the main chain of the (co)polymer before grafting) or else the reaction of a —$CO_2H$ or analogous function with an amine or analogous function of another compound to form an amide linkage (the other compound being, presently, in our case in point, the main chain of the (co)polymer before grafting).

Included advantageously as amino acids capable of forming, after amidation reaction, grafts in accordance with the invention, in the form of an amino acid residue, are the following natural α-amino acids: arginine, asparagine, aspartic acid, glutamic acid, glutamine, histidine and lysine, these amino acids, after grafting, all constituting amino acid residues bearing both a proton acceptor group (here an amine group) and a proton donor group (here a carboxyl group). In order to meet this condition, the amide linkage may be made by reaction of an $NH_2$ group of the amino acid (as is the case for arginine, asparagine, glutamine, histidine and lysine) or of a —$CO_2H$ group of the amino acid (as is the case for aspartic acid and glutamic acid).

Grafts also include the amino acid residues obtained from non-natural amino acids containing acid functions other than a carboxyl function, it being possible for said amino acids to be selected from the following amino acids:

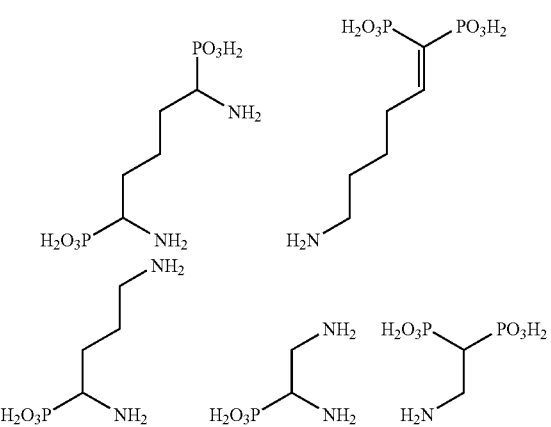

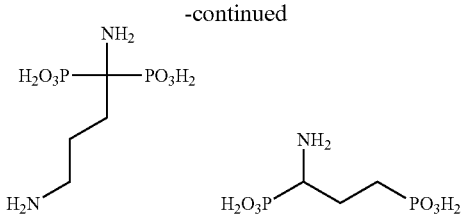

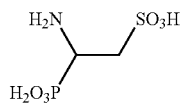

subject to the proviso that, after grafting, the amino acid residues contain both a proton acceptor group and a proton donor group.

Amino acids capable of forming grafts in accordance with the invention are advantageously lysine, arginine and histidine, in which case the grafts will correspond to the amino acid residues of formulae (I) to (III) below:

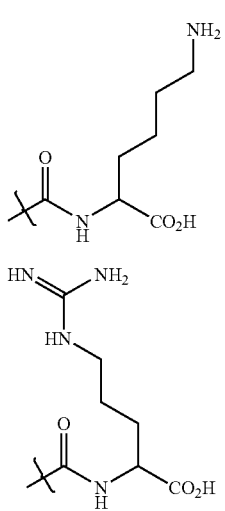

(I)

(II)

(III)

In addition to grafts in accordance with the definition given above, the graft (co)polymer may comprise other grafts which do not conform to the definition given above (that is, which do not contain both a proton acceptor group and a proton donor group). Grafts not conforming to the definition given above may be amino acid residues obtained from amino acids such as cysteine, proline, serine, threonine and tyrosine, non-natural amino acids, such as those of the following formulae:

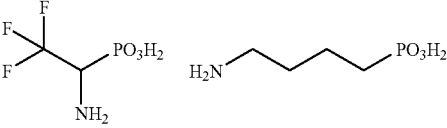

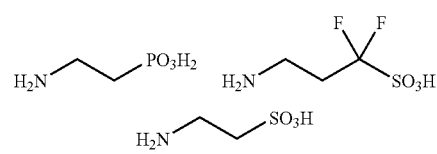

or else compounds of the following formulae:

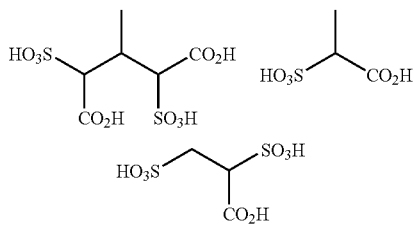

these compounds being, respectively, 3-methyl-2,4-disulphopentanedioic acid, 2-sulpho-propanoic acid and 2,3-disulphopropanoic acid.

More particularly, the graft (co)polymers may comprise grafts corresponding to an amino acid residue obtained from taurine, said grafts conforming to the formula (IV) below:

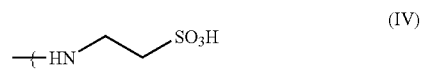

(IV)

The grafts may also correspond to a peptide sequence, namely a sequence resulting from concatenation of amino acid residues linked by amide linkages, especially of natural α-amino acids, by an amidation reaction, subject to the proviso that the peptide sequence comprises at least one proton acceptor group and at least one proton donor group.

Amino acids which may form part of said peptide sequences may be selected from the amino acids listed above, and especially from lysine, aspartic acid, histidine and arginine.

Grafts corresponding to peptide sequences in accordance with the invention may conform to one of the following formula:

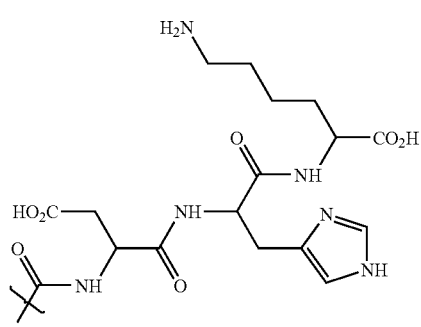

(V)

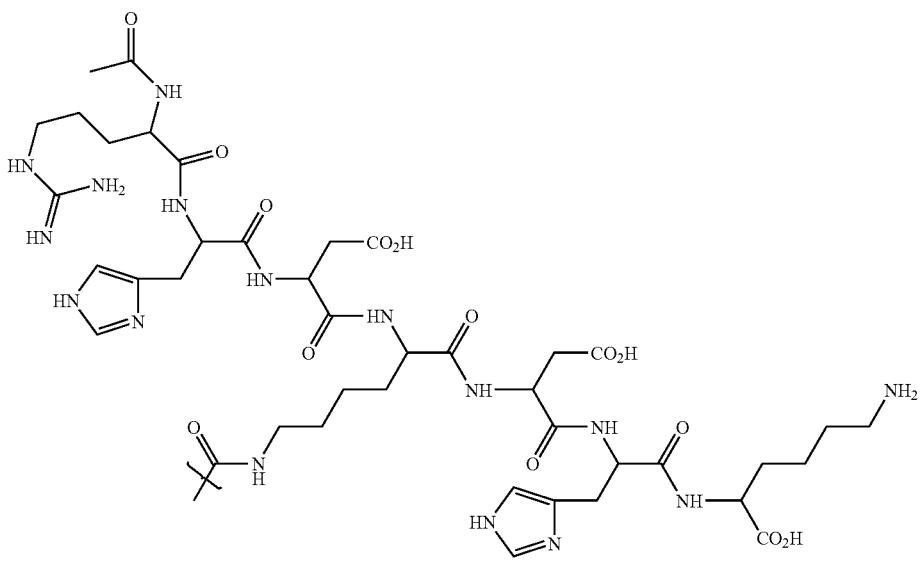

(VI)

the peptide sequence of formula (V) resulting from the concatenation of aspartic acid-histidine-lysine amino acids, whereas the peptide sequence of formula (VI) results from the concatenation of arginine-histidine-aspartic acid-lysine-aspartic acid-histidine-lysine amino acids.

The main chain of the graft (co)polymers making up the membranes of the invention may be an aliphatic or aromatic hydrocarbon chain optionally containing one or more heteroatoms, such as O, N, S, a halogen atom, preferably fluorine.

The backbone may advantageously be a backbone comprising a heterocyclic repeating unit to which, wholly or partly, grafts as defined above are covalently bonded.

The backbone may therefore be a polypyrrole backbone.

More specifically, the copolymers making up the membranes of the invention may comprise the following repeating units:

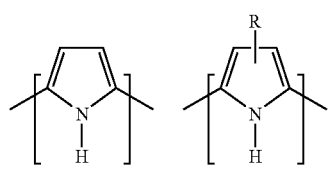

where R represents a graft conforming to the definitions given above.

It is specified that the following representation:

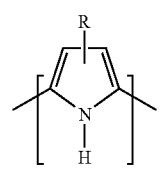

signifies that the group R may be bonded to the pyrrole ring in the following ways:

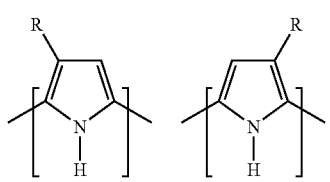

Thus, specific membranes in accordance with the invention may be one of the following membranes:
- a membrane composed of a copolymer comprising a polypyrrole backbone and grafts of formula (I);
- a membrane composed of a copolymer comprising a polypyrrole backbone and grafts of formula (II);
- a membrane composed of a copolymer comprising a polypyrrole backbone and grafts of formula (III);

a membrane composed of a copolymer comprising a polypyrrole backbone and grafts of formulae (I), (II) and (III);

a membrane composed of a copolymer comprising a polypyrrole backbone and grafts of formulae (I), (II), (III) and (IV);

a membrane composed of a copolymer comprising a polypyrrole backbone and grafts of formula (V);

a membrane composed of a copolymer comprising a polypyrrole backbone and grafts of formula (VI).

These membranes are particularly advantageous in that they combine both the electron conductivity of the polypyrrole backbone and the proton conductivity of the grafts. Furthermore, these membranes, relative to membranes made of Nafion®, for example, exhibit a thermal stability of above 90° C. and mechanical properties which are stable in the presence of solvents such as water.

The backbone may be composed of repeating units obtained from the polymerization of vinyl monomers, such as acrylic acid and vinyl amine, which, before grafting, owing to their pendant —COOH and —$NH_2$ functions, are capable of forming a covalent amide linkage with grafts of the amino acid residue or peptide sequence type. The aforementioned vinyl monomers may advantageously comprise one or more fluorine atoms, the advantage being that a backbone obtained from the polymerization of monomers of this kind is resistant to corrosion and exhibits good mechanical properties and low gas permeability.

According to a first embodiment, the membranes of the invention may be composed exclusively of graft (co)polymers as defined above.

According to a second embodiment, the membranes of the invention comprise a polymeric support matrix comprising through-pores, said pores being filled with graft (co)polymers as defined above.

The polymeric support matrix is advantageously made of a polymer selected from polyurethanes, polyolefins, polycarbonates and/or polyethylene terephthalates, these polymers being advantageously fluorinated, or even perfluorinated. The fluorinated (co)polymers that may be suitable include polyvinylidene fluoride, tetrafluoroethylene-tetrafluoropropylene copolymers (known by the abbreviation FEP), ethylene-tetrafluoroethylene copolymers (known by the abbreviation ETFE), hexafluoropropene-vinylidene fluoride copolymers (known by the abbreviation HFP-co-VDF). The support matrices composed of a fluorinated (co)polymer are particularly advantageous in that they exhibit corrosion resistance, good mechanical properties and low gas permeability. They are therefore particularly suitable for inclusion in the composition of fuel-cell membranes. More particularly, polyvinylidene fluoride is chemically inert (being resistant, in particular, to corrosion), has good mechanical properties, has a glass transition temperature of from −42° C. to −38° C., depending on the crystalline phase, and has a melting point of 170° C. and a density of 1.75 g/cm$^3$. This polymer is readily extruded and may be present in particular in two crystalline forms, depending on the orientation of the crystallites: the α phase and the β phase, the β phase being characterized in particular by piezoelectric properties.

The through-pores of the support matrix are, as indicated above, filled with the graft copolymers as defined above, and connect two opposing faces of the support matrix. Typically, they are substantially cylindrical in form. They may have a diameter of from 50 to 100 μm, in which case they may be termed micropores. They may also have a diameter of from 10 to 100 nm, in which case they may be termed nanopores.

Conventionally, the support matrices may contain from $5 \times 10^4$ to $5 \times 10^{10}$, preferably from $5 \times 10^5$ to $5 \times 10^9$, pores per cm$^2$.

In either the first or the second embodiment, the membranes of the invention conventionally have a thickness of the order of 100 μm, more particularly a thickness of from 1 to 50 μm.

The abovementioned graft (co)polymers may be prepared in accordance with a number of variant embodiments.

Hence, according to a first variant, the graft (co)polymers may be prepared by a method comprising a step of reacting a base (co)polymer comprising pendant functions X with at least one graft precursor comprising a function A capable of reacting with a pendant function X to form a covalent bond, the grafts, at the outcome of said reaction, being bonded to the base copolymer.

For example, the pendant functions X may be carboxyl functions —$CO_2H$, optionally activated, for example, in the form of succinimide ester, whereas the functions A may be amine functions —$NH_2$.

When the grafts are amino acid residues or peptide sequences and the pendant functions X are carboxyl functions —$CO_2H$, the graft precursors will be amino acids or peptide sequences comprising a free $NH_2$ function capable of reacting with the optionally activated carboxyl function to form an amide linkage. The amino acid or the peptide sequence will, where appropriate, comprise other —$NH_2$ functions, protected by protecting groups, in order to prevent secondary reactions. The —$NH_2$ functions may be protected, for example, by protecting groups of Boc (tert-butyloxycarbonyl) or Fmoc (9-fluorenylmethyloxycarbonyl) type.

When the membranes are composed of copolymers comprising a polypyrrole backbone and grafts consisting of amino acid residues or peptide sequences, the method may include a step of reacting a base copolymer in which the backbone comprises at least one repeating unit of the following formula:

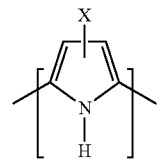

where X is as defined above, and optionally a repeating unit of the following formula:

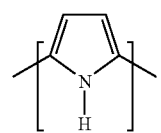

with at least one amino acid or peptide sequence comprising a function A as defined above, said amino acid or peptide sequence being optionally protected at functions capable of reacting with the group X.

The method, when grafting has been carried out, may therefore comprise a step of deprotection of the protected groups.

Accordingly, in order to prepare a membrane based on a copolymer comprising the following repeating units:

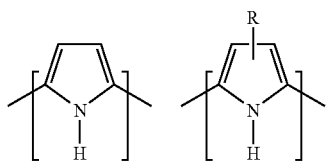

where R represents a graft conforming to at least one of the formulae (I) to (VI) as defined above, it is possible to con-template, in a first phase, reacting a base copolymer comprising the following repeating units:

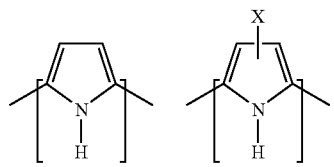

where X represents a —CO$_2$H group, with, respectively, at least one of the following amino acids or peptide sequences:

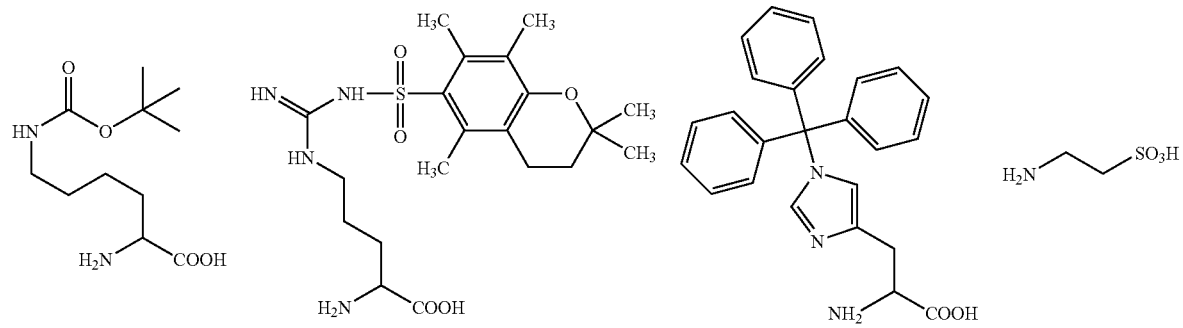

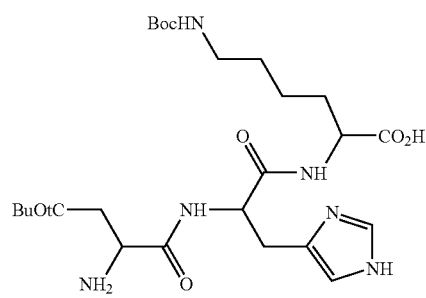

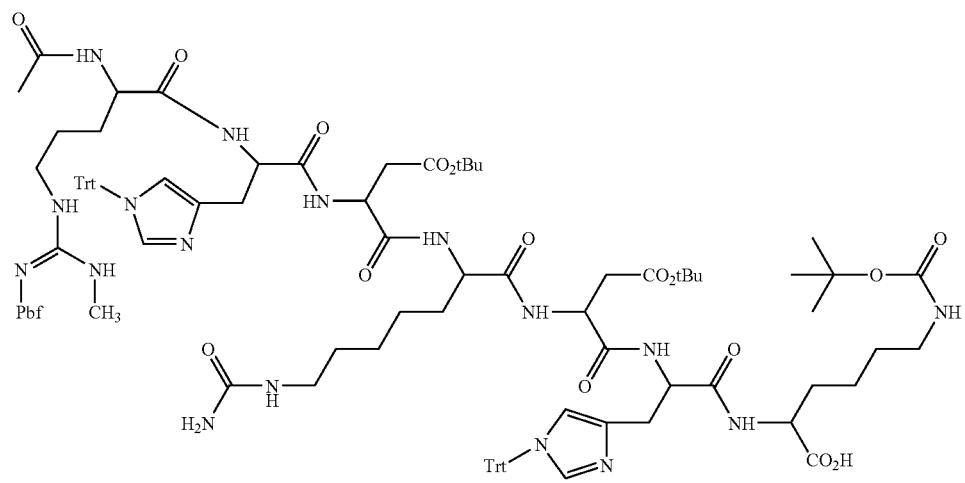

where the acronyms OtBu, Pbf, Trt and Boc correspond, respectively, to the following groups: O-tert-butyl, N-ω-dimethyl-N-ω'-2,2,4,6,7-pentamethyldihydrobenzofuran-5-sulphonyl, trityl and tert-butyloxycarbonyl, followed by a step of deprotection in order to liberate the protected functions, this step of deprotection possibly consisting of contacting the graft copolymer with a solution of trifluoroacetic acid.

According to a second variant embodiment, the graft (co)polymers may be prepared by a method comprising a step of polymerizing at least one monomer bearing at least one side chain corresponding to the abovementioned grafts.

When the graft copolymer is a polypyrrole copolymer comprising the following repeating units:

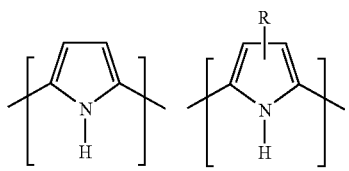

the preparation of this copolymer may consist of copolymerizing the following monomers:

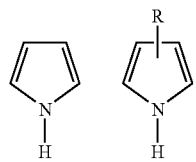

where R represents a graft comprising at least one proton acceptor group and at least one proton donor group, it being possible more particularly for R to be an amino acid residue or a peptide sequence, and it being possible, even more specifically, for R to be a graft conforming to one of the formulae (I) to (VI) as defined above. Preferably, R is in position 3 of the ring, in other words as follows:

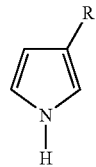

The monomers which are able to react to form the abovementioned (co)polymers conform to the following formula:

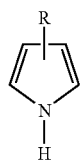

where R represents an amino acid residue or a peptide sequence, it being possible for R to represent, more particularly, a group of formulae (I) to (VI) as defined above, R being preferably in position 3 as defined above.

These monomers are conventionally prepared by an amidation reaction of a compound of the following formula:

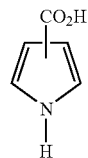

with an amino acid or a peptide sequence containing a free —NH$_2$ function.

According to a third variant embodiment, the graft (co)polymers may be prepared by radiografting, the grafts being produced by free-radical reaction with a polymer which has been irradiated beforehand so as to produce free-radical centres, said polymer conventionally taking the form of a membrane.

The polymer (referred to as the base polymer) may be irradiated by subjecting the base polymer to an electron beam (electron irradiation) or to a beam of heavy ions.

The electron irradiation allows free-radical centres to be created throughout the volume of the base membrane. With this type of irradiation it is therefore possible to carry out free-radical grafting of the grafts that ensure proton conduction via a proton gradient throughout the volume of the membrane. However, when the thickness of the base membrane is substantial, it may be difficult to graft it to its core with grafts, since the diffusion of the compounds forming part of the composition of grafts (such as monomers) may prove to be difficult. In this case it is important to select, appropriately, a suitable solvent, such that the membrane is penetrated through its entire volume, including its core.

Irradiation with heavy ions modifies the base membrane only in the irradiation tracks, from which the grafts can be grafted.

Bear in mind that, independently of the method of irradiation, the compounds that may form part of the composition of the grafts (such as monomers) are capable of undergoing grafting only at those locations in which irradiation has produced free-radical centres in the membrane (that is, in the irradiation tracks with regard to irradiation with heavy ions, and in the volume of the membrane with regard to electron irradiation).

The proton gradient is produced by an appropriate selection of molecules to be grafted on to the base membrane (for example, amino acids or similar molecules). The grafting of such molecules may therefore be considered to correspond to a patterning of the base membrane by molecular packing, the molecules being positioned on the membrane in such a way as to lead to a proton gradient owing to the local concentration of said molecules in the membrane.

The proton gradient may be produced throughout the mass of the membrane, in which case it will result from the grafting of appropriate molecules following the electron irradiation of a base membrane.

As an example, in order to obtain a proton gradient phenomenon by electron irradiation, consideration may be given to operating by radiografting a base membrane with the following molecules:

a first molecule having an acidity constant pKa$_1$, which spreads and is grafted throughout the volume of the base membrane;

a second molecule having an acidity constant $pKa_2$, which is grafted on to one of the faces of the base membrane, said face being the only face to be exposed to said second molecule;

a third molecule, having an acidity constant $pKa_3$, which is grafted on to an opposite face to the face on to which the second molecule is grafted, this opposite face being the only face to be exposed to said third molecule.

The pKas ($pKa_1$, $pKa_2$ and $pKa_3$) are selected such as to allow proton exchange from one face to the other and hence to produce a proton gradient.

The proton gradient may also be produced by grafting the appropriate molecules into the latent tracks left by the passage of a beam of heavy ions.

Accordingly, the grafting of molecules in the latent tracks may be pictured according to the following scheme:

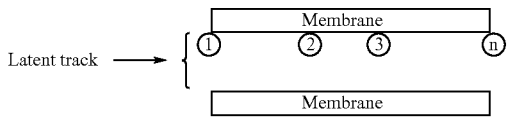

where the molecules symbolized by 1, 2, 3 and n have, respectively, acidity constants $pKa_1$, $pKa_2$, $pKa_3$ and $pKa_n$, where $pKa_1 > pKa_2 > pKa_3 > pKa_n$.

The grafting of molecules in the latent tracks may also be pictured in accordance with the following scheme:

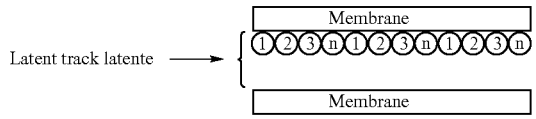

where the molecules symbolized by 1, 2, 3 and n have, respectively, acidity constants $pKa_1$, $pKa_2$, $pKa_3$ and $pKa_n$, where $pKa_1 > pKa_2 > pKa_3 > pKa_n$.

Finally, the grafting of molecules into the latent tracks may also be pictured according to the following scheme:

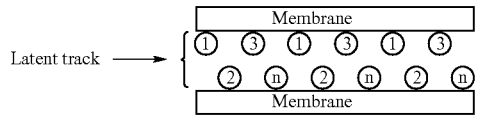

where the molecules symbolized by 1, 2, 3 and n have, respectively, acidity constants $pKa_1$, $pKa_2$, $pKa_3$ and $pKa_n$, where $pKa_1 > pKa_2 > pKa_3 > pKa_n$.

Where the membranes of the invention are composed exclusively of the abovementioned graft (co)polymers, the method for preparing said membranes will correspond, conventionally, to the methods for preparing said copolymers as set out in accordance with the first variant, second variant or third variant embodiment.

The advantage of producing the membranes by radiografting is to allow selective grafting, especially the possibility of using masks in order to target this grafting. Alternatively, the method for preparing such membranes may comprise the following steps:

a step of producing said graft (co)polymers, more particularly in accordance with the first variant or the second variant, in the through-pores of a polymeric support matrix;

a step of removing said polymeric support matrix.

The support matrix may be removed, conventionally, by destruction with a selective reagent that is not detrimental to the graft (co)polymers making up the membranes of the invention.

Where the membranes of the invention comprise a polymeric support matrix comprising through-pores filled with the abovementioned graft (co)polymers, the method for preparing said membranes includes a step of implementing said method for producing the abovementioned graft (co)polymers in the through-pores of the support matrix.

The support matrix may be prepared beforehand by irradiation of a base membrane so as to produce an organized porosity, said porosity determining the morphological features of the subsequent membrane of the invention, in so far as the preparation of said membrane will be carried out within the porosity of the support matrix. The step of irradiation may be followed by a step of chemical etching so as to finalize the patterning of the support matrix.

The step of irradiation may be carried out by ion bombardment, such as bombardment with xenon.

The support matrix may be made of a material selected from polycarbonate (PC), polyvinylidene fluoride (PVDF) and polyethylene terephthalate (PET).

Where the graft copolymers are produced by the first variant (in other words by functionalization of a base polymer), the through-pores of the support matrix will be coated, in a first phase, with a base (co)polymer comprising pendant functions X as defined above, and then, in a second phase, the matrix will be contacted with a graft precursor comprising a function A as defined above.

Where the graft copolymers are produced according to the second variant, the support matrix is contacted with a solution containing the appropriate monomers, and the polymerization is carried out until the through-pores of said support matrix are blocked, generally until the gas permeability is low, preferably close to that of a membrane not containing pores or having a porosity of not more than 10% or typically equal to 5%. Further details concerning polymerization in the pores of a matrix may be found in patent application FR 2 770 150.

As mentioned above, the membranes of the invention exhibit, among other qualities, a proton conduction which is improved in relation to that of the membranes conventionally employed, such as Nafion® membranes. Hence, of course, these membranes can be incorporated into fuel cell devices.

The invention accordingly further provides a fuel cell device comprising at least one membrane as defined above.

This device comprises one or more membrane electrode assemblies.

For the preparation of such an assembly, the membrane may be placed between two electrodes, for example, made of carbon paper impregnated with a catalyst.

The assembly is subsequently pressed at an appropriate temperature to produce effective adhesion between electrode and membrane.

The resulting membrane electrode assembly is subsequently placed between two plates, which provide for electrical conduction and the supply of reagents to the electrodes. These plates are commonly referred to as bipolar plates.

The invention will now be described with reference to the examples below, which are given for illustration and not for limitation.

DETAILED DESCRIPTION OF PARTICULAR EMBODIMENTS

The examples below will illustrate the preparation of membranes comprising a base backbone composed of repeating polypyrrole units and amino acid residue grafts (examples 1, 2, 3, 4 and 5) or peptide sequence grafts (examples 6 and 7).

In these examples, the following acronyms are employed:

Ac: acetyl; AcOH: acetic acid; Arg: arginine; Asp: aspartic acid; Boc: tert-butyloxycarbonyl; DCM: dichloromethane; Dde: 1-(4,4-dimethyl-2,6-dioxocyclohex-1-ylidene)ethyl; DIEA: diisopropylethylamine; DMF: dimethylformamide; EDC: 1-ethyl-3-(3-dimethylaminopropyl)carbodiimide hydrochloride; Fmoc: 9-fluorenylmethyloxycarbonyl; His: histidine; HBTU: N-[(1H-benzotriazol-1-yl)dimethylamino)methylene]-N-methylmethanaminium hexafluorophosphate; HOBt: N-hydroxybenzotriazole; Lys: lysine; MeOH: methanol; NHS: N-hydroxysuccinimide; ONS: O—N-succinimide; OtBu: O-tert-butyl; Pbf: N-ω-dimethyl-N-ω'-2,2,4,6,7-pentadimethyldihydrobenzofuran-5-sulphonyl; PC: polycarbonate; Pmc: 2,2,5,7,8-pentamethylchroman-6-sulphonyl; TFA: trifluoroacetic acid; TIS: triisopropylsilane; Trt: trityl.

EXAMPLE 1

This example illustrates the preparation of a membrane which is composed of a graft copolymer comprising a polypyrrole backbone and grafts derived from lysine, of the following formula:

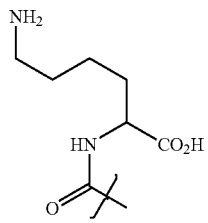

The copolymer prepared thus comprises the following sequence of units:

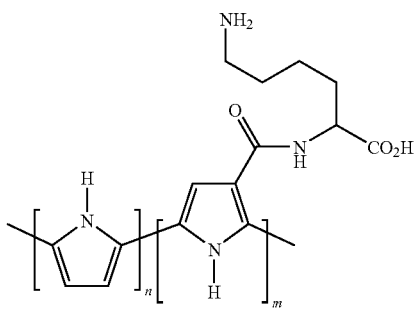

where n indicates the number of repeating units of the unit between square brackets and m indicates the number of repeating units of the unit between square brackets. It is understood that the units between square brackets may be arranged randomly within the chain.

For preparing this copolymer, the reaction scheme is as follows:

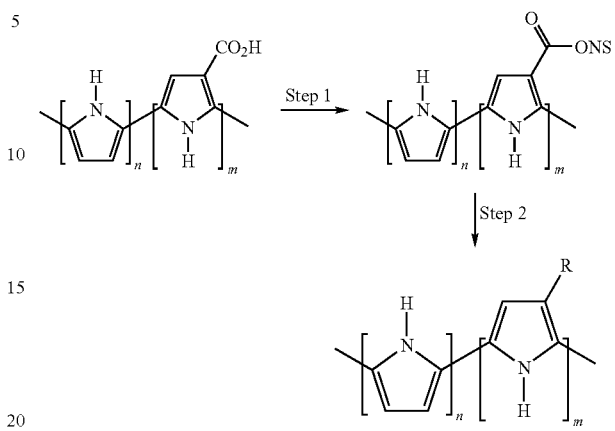

where R represents the graft derived from lysine, whose formula is given above, the reactants of step 1 being N-hydroxysuccinimide (NHS) in the presence of 1-ethyl-3-(3-dimethylaminopropyl)carbodiimide hydrochloride (EDC) and water, whereas the reactants of step 2 are the amino acid lysine protected on certain functions, in the presence of diisopropylethylamine (DIEA) and water, for the grafting of said peptide sequence, and trifluoroacetic acid (TFA) in the presence of water and triisopropylsilane (TIS), for the deprotection of the protected functions of the amino acid.

In the present case, the protected amino acid lysine corresponds to the following formula: H-Lys(Boc)-OH, or the following structural formula:

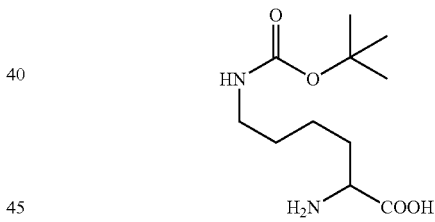

Two embodiments of the membrane are illustrated below, depending on whether it is used starting from a support matrix or not.

a) Fabrication of the Membrane of the Invention Using a Support Matrix

The functionalized polypyrrole copolymer is produced in a two-compartment cell on a polycarbonate support matrix. The carboxylated polypyrrole base copolymer (comprising pyrrole and 3-carboxypyrrole units) is deposited on the polycarbonate support matrix.

EDC (0.08 M) and NHS (0.16 M) are dissolved in an aqueous medium. The two compartments of the cell are filled with 10 ml of the solution and the mixture is cooled to 4° C. After stirring at this temperature for an hour, the reaction mixture is stirred at ambient temperature for 3 hours. The activated membrane is washed twice with distilled water. The protected lysine amino acid (461.24 mg; 1.69 mmol) and DIEA (588 µl, 3.38 mmol) are dissolved in an aqueous medium and added to the two compartments. The resulting solution is stirred at ambient temperature for 12 hours. The membrane is washed with water and dried and a solution of TFA/H$_2$O/TIS (9.5:0.25:0.25) is added to the compartments. After 3 hours at ambient temperature, the TFA solution is removed and aqueous sodium hydroxide solution (2N) is added.

After 2 hours at 80° C., the final membrane, with the PC matrix removed, is washed again with fresh water and dried carefully at ambient temperature.

b) Fabrication of the Membrane Without Using a Support Matrix

According to this embodiment, a membrane comprising pyrrole and 3-carboxypyrrole units is reacted with EDC (0.08 M) and NHS (0.16 M).

After stirring at 4° C. for an hour, the mixture is stirred at ambient temperature for 3 hours. The membrane is washed twice with water. The protected lysine amino acid (416.24 mg, 1.69 mmol) and DIEA (588 µl, 3.38 mmol) are dissolved in an aqueous medium and added to the two compartments. The resulting solution is stirred at ambient temperature for 12 hours. The membrane is washed with water and dried and a solution of TFA/H$_2$O/TIS (9.5:0.25:0.25) is added to the compartments. After 3 hours at ambient temperature, the resulting membrane is washed again with fresh water and dried carefully at ambient temperature.

EXAMPLE 2

This example illustrates the preparation of a membrane composed of a graft copolymer comprising a polypyrrole backbone and grafts derived from arginine, of the formula below:

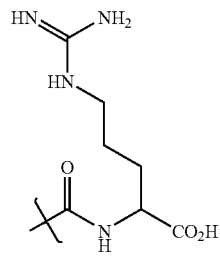

The copolymer prepared thus comprises the following sequence of units:

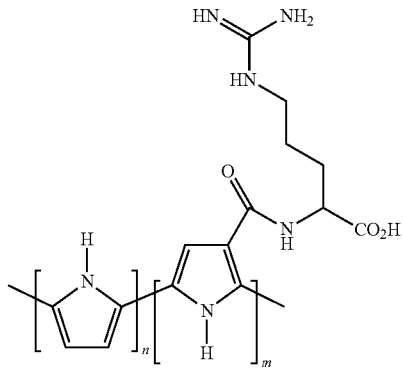

where n indicates the number of repeating units of the unit between square brackets and m indicates the number of repeating units of the unit between square brackets.

For preparing this copolymer, the reaction scheme is as follows:

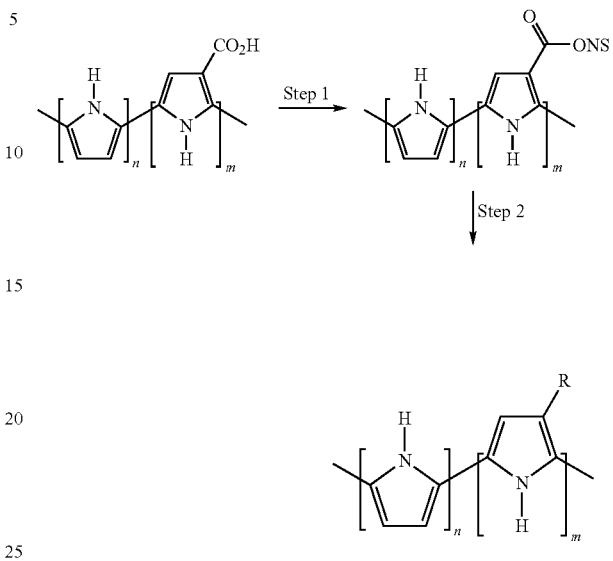

where R represents the graft derived from arginine, the formula of which is given above, the reactants of step 1 being N-hydroxysuccinimide (NHS) in the presence of 1-ethyl-3-(3-dimethylaminopropyl)carbodiimide hydrochloride (EDC) and water, whereas the reactants of step 2 are the amino acid arginine protected on certain functions, in the presence of diisopropylethylamine (DIEA) and water, for the grafting of said amino acid, and trifluoroacetic acid (TFA) in the presence of water and triisopropylsilane (TIS), for the deprotection of the protected functions of the amino acid.

In the present case, the protected amino acid arginine corresponds to the following formula: H-Arg(Pmc)-OH, or the following structural formula:

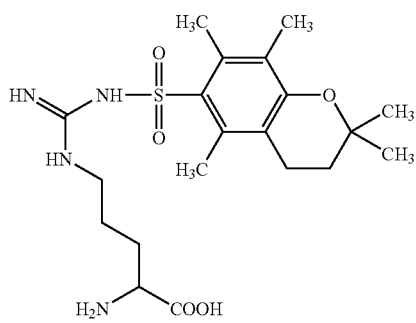 [SMILES: Cc1c(C)c(S(=O)(=O)NC(=N)NCCCC(N)C(=O)O)c(C)c2c1OC(C)(C)CC2]

Two embodiments of the membrane were employed in the context of this example:
  one embodiment with a support matrix, this embodiment being identical to that set out in the context of Example 1, apart from the introduction of the protected amino acid arginine in place of the protected lysine (in an amount of 744.61 mg, 1.69 mmol);
  one embodiment without a support matrix, this embodiment being identical to that set out in the context of Example 1, apart from the introduction of the protected amino acid arginine in place of the protected lysine (in an amount of 744.61 mg, 1.69 mmol).

EXAMPLE 3

This example illustrates the preparation of a membrane composed of a graft copolymer comprising a polypyrrole backbone and grafts derived from histidine, of the formula below:

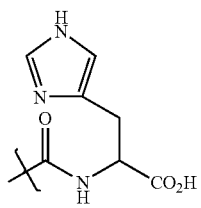

The copolymer prepared thus comprises the following sequence of units:

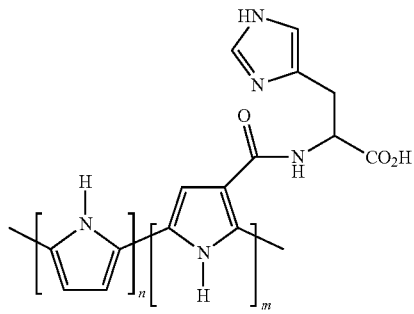

where n indicates the number of repeating units of the unit between square brackets and m indicates the number of repeating units of the unit between square brackets. It is understood that the units between square brackets may be arranged randomly within the chain.

For preparing this copolymer, the reaction scheme is as follows:

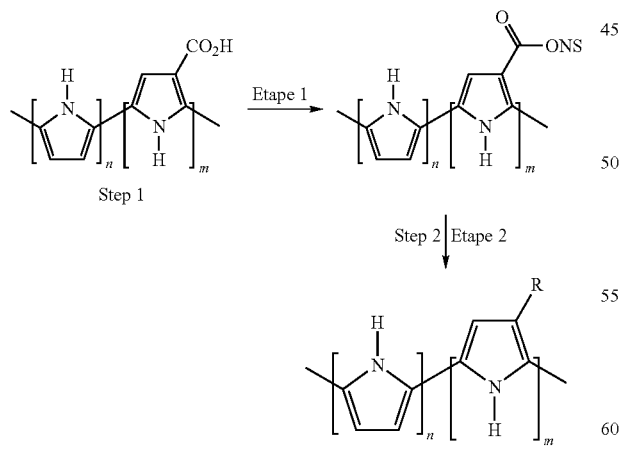

where R represents the graft derived from histidine, the formula of which is given above, the reactants of step 1 being N-hydroxysuccinimide (NHS) in the presence of 1-ethyl-3-(3-dimethylaminopropyl)carbodiimide hydrochloride (EDC) and water, whereas the reactants of step 2 are the amino acid histidine protected on certain functions, in the presence of diisopropylethylamine (DIEA) and water, for the grafting of said amino acid, and trifluoroacetic acid (TFA) in the presence of water and triisopropylsilane (TIS), for the deprotection of the protected functions of the amino acid.

In the present case, the protected amino acid histidine corresponds to the following formula: H-His(Trt)-OH, or the following structural formula:

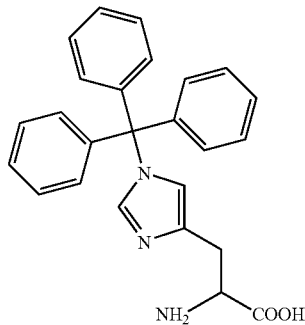 [SMILES: NC(Cc1cn(C(c2ccccc2)(c2ccccc2)c2ccccc2)cn1)C(=O)O]

Two embodiments of the membrane were employed in the context of this example:
  one embodiment with a support matrix, this embodiment being identical to that set out in the context of Example 1, apart from the introduction of the protected amino acid histidine in place of the protected lysine (in an amount of 671.77 mg, 1.69 mmol);
  one embodiment without a support matrix, this embodiment being identical to that set out in the context of Example 1, apart from the introduction of the protected amino acid histidine in place of the protected lysine (in an amount of 671.77 mg, 1.69 mmol).

EXAMPLE 4

This example illustrates the preparation of a membrane composed of a graft copolymer comprising a polypyrrole backbone and grafts derived from lysine, arginine and histidine (in 1:1:1 proportions), of the following formulae:

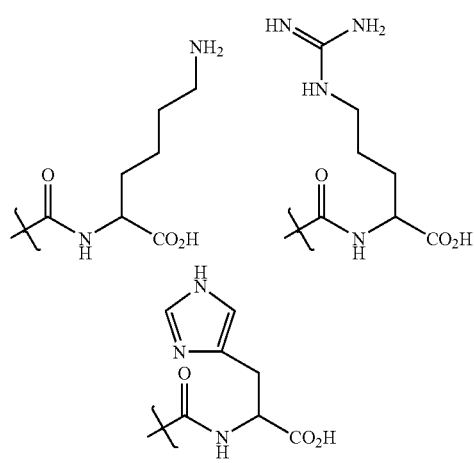

The copolymer prepared thus comprises the following sequence of units:

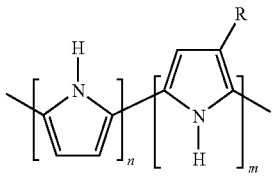

where n indicates the number of repeating units of the unit between square brackets and m indicates the number of repeating units of the unit between square brackets, and R represents equally a graft derived from lysine, a graft derived from arginine and a graft derived from histidine, the three types of grafts being present in the copolymer in 1:1:1 proportions.

For preparing this copolymer, the reaction scheme is as follows:

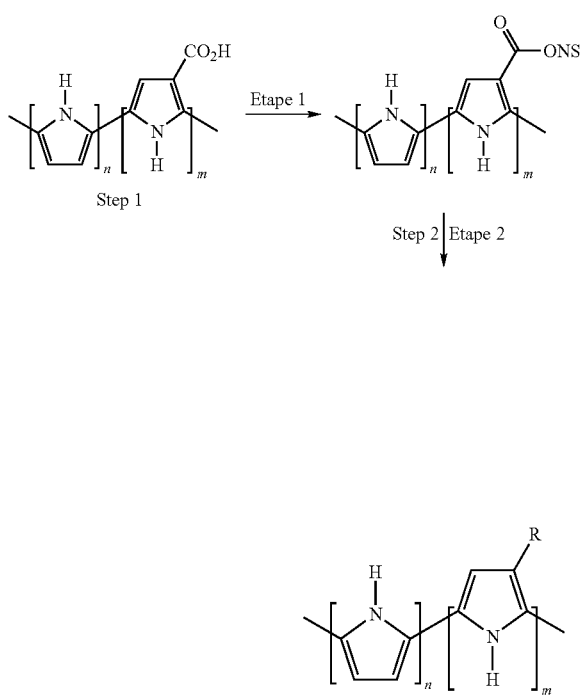

where R is as defined above, the reactants of step 1 being N-hydroxysuccinimide (NHS) in the presence of 1-ethyl-3-(3-dimethylaminopropyl)carbodiimide hydrochloride (EDC) and water, whereas the reactants of step 2 are the amino acid lysine, the amino acid histidine and the amino acid arginine, protected on certain functions, in the presence of diisopropylethylamine (DIEA) and water, for the grafting of said amino acids, and trifluoroacetic acid (TFA) in the presence of water and triisopropylsilane (TIS), for the deprotection of the protected functions of the amino acids.

In the present case, the protected amino acid arginine corresponds to the following formula: H-Arg(Pmc)-OH, or the following structural formula:

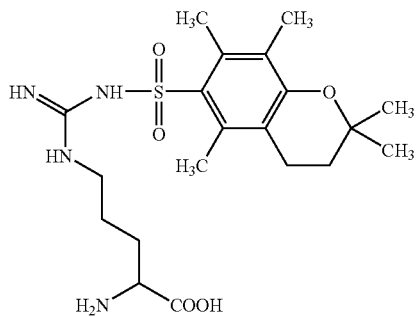

The protected amino acid lysine corresponds to the following formula: H-Lys(Boc)-OH, or the following structural formula:

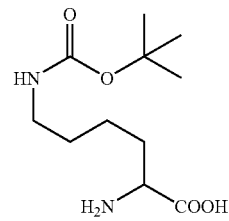 [SMILES: CC(C)(C)OC(=O)NCCCCC(N)C(=O)O]

The protected amino acid histidine corresponds to the following formula: H-His(Trt)-OH, or the following structural formula:

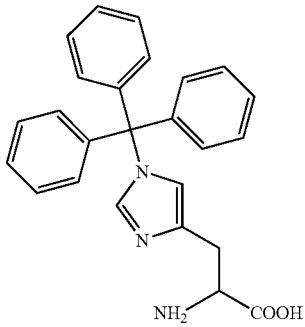 [SMILES: NC(Cc1cn(C(c2ccccc2)(c2ccccc2)c2ccccc2)cn1)C(=O)O]

Two embodiments of the membrane were employed in the context of this example:
- one embodiment with a support matrix, this embodiment being identical to that set out in the context of Example 1, apart from the introduction of the protected amino acids lysine, arginine and histidine in place of the protected amino acid lysine alone, and in the following respective proportions (138.66 mg, $5.63 \times 10^{-4}$ mol; 248.05 mg, $5.63 \times 10^{-4}$ mol; 223.79 mg, $5.63 \times 10^{-4}$ mol);
- one embodiment without a support matrix, this embodiment being identical to that set out in the context of Example 1, apart from the introduction of the protected amino acids lysine, arginine and histidine in place of the protected amino acid lysine alone, and in the following respective proportions (138.66 mg, $5.63 \times 10^{-4}$ mol; 248.05 mg, $5.63 \times 10^{-4}$ mol; 223.79 mg, $5.63 \times 10^{-4}$ mol).

EXAMPLE 5

This example illustrates the preparation of a membrane composed of a graft copolymer comprising a pyrrole backbone and grafts derived from lysine, arginine, histidine and taurine (in 1:1:1:1 proportions), of the following formulae:

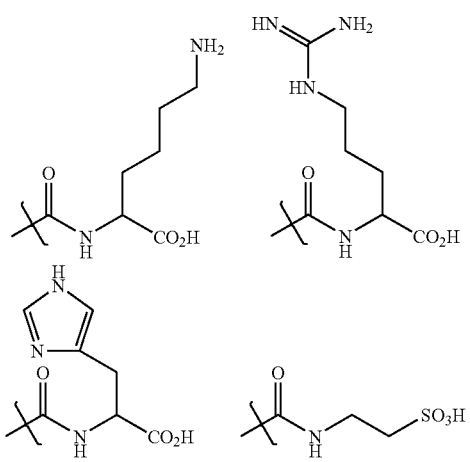

The copolymer prepared thus comprises the following sequence of units:

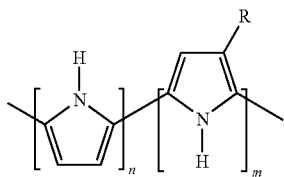

where n indicates the number of repeating units of the unit between square brackets and m indicates the number of repeating units of the unit between square brackets, and R represents equally a graft derived from lysine, a graft derived from arginine, a graft derived from histidine and a graft derived from taurine.

For preparing this copolymer, the reaction scheme is as follows:

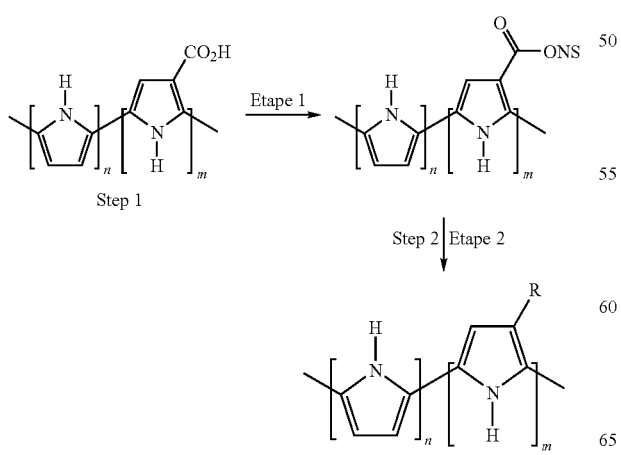

where R is as defined above, the reactants of step 1 being N-hydroxysuccinimide (NHS) in the presence of 1-ethyl-3-(3-dimethylaminopropyl)carbodiimide hydrochloride (EDC) and water, whereas the reactants of step 2 are the amino acid lysine, the amino acid histidine and the amino acid arginine, protected on certain functions, and the amino acid taurine, in the presence of diisopropylethylamine (DIEA) and water, for the grafting of said amino acids, and trifluoroacetic acid (TFA) in the presence of water and triisopropylsilane (TIS), for the deprotection of the protected functions of the amino acids.

In the present case, the protected amino acid arginine corresponds to the following formula: H-Arg(Pmc)-OH, or the following structural formula:

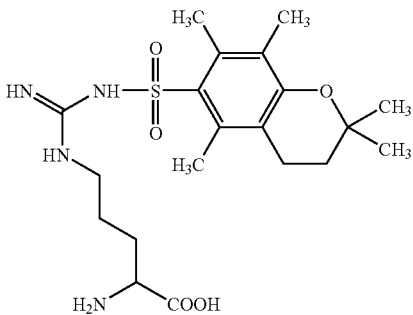 [SMILES: Cc1c(C)c(S(=O)(=O)NC(=N)NCCCC(N)C(=O)O)c(C)c2c1OC(C)(C)CC2]

The protected amino acid lysine corresponds to the following formula: H-Lys(Boc)-OH, or the following structural formula:

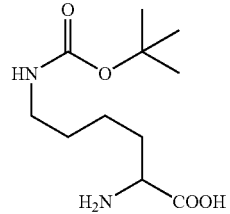 [SMILES: CC(C)(C)OC(=O)NCCCCC(N)C(=O)O]

The protected amino acid histidine corresponds to the following formula: H-His(Trt)-OH, or the following structural formula:

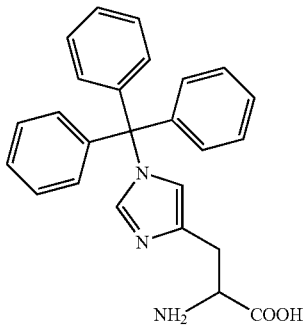 [SMILES: NC(Cc1cn(C(c2ccccc2)(c2ccccc2)c2ccccc2)cn1)C(=O)O]

Two embodiments of the membrane were employed in the context of this example:
- one embodiment with a support matrix, this embodiment being identical to that set out in the context of Example 1, apart from the introduction of the protected amino acids lysine, arginine and histidine and the amino acid taurine in place of the protected amino acid lysine alone, and in the following respective proportions (104 mg, $4.225 \times 10^{-4}$ mol; 186.15 mg, $4.225 \times 10^{-4}$ mol; 167.9 mg, $4.225 \times 10^{-4}$ mol; 52.8 mg, $4.225 \times 10^{-4}$ mol);
- one embodiment without a support matrix, this embodiment being identical to that set out in the context of Example 1, apart from the introduction of the protected amino acids lysine, arginine and histidine and the amino acid taurine in place of the protected amino acid lysine alone, and in the following respective proportions (104 mg, $4.225 \times 10^{-4}$ mol; 186.15 mg, $4.225 \times 10^{-4}$ mol; 167.9 mg, $4.225 \times 10^{-4}$ mol; 52.8 mg, $4.225 \times 10^{-4}$ mol).

EXAMPLE 6

This example illustrates the preparation of a membrane composed of a graft copolymer comprising a polypyrrole backbone and grafts of the following formula:

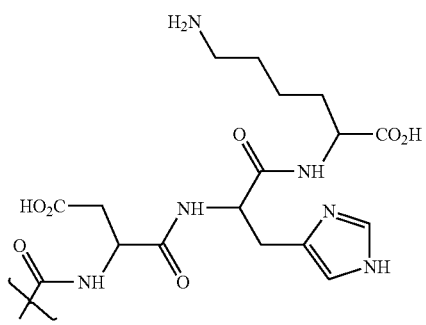 [SMILES: CC(=O)NC(CC(=O)O)C(=O)NC(Cc1c[nH]cn1)C(=O)NC(CCCCN)C(=O)O]

where this group is represented hereinafter by the prefix —R.

The copolymer prepared thus comprises the following sequence of units:

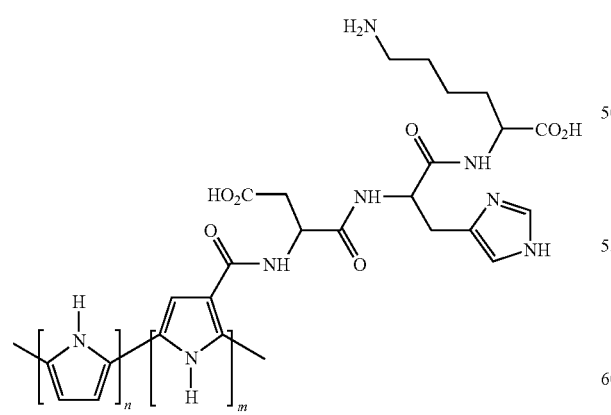

where n indicates the number of repeating units of the unit between square brackets and m indicates the number of repeating units of the unit between square brackets.

To prepare this copolymer, the reaction scheme is as follows:

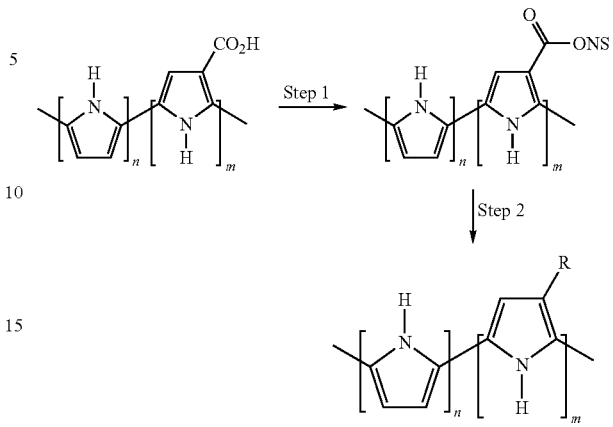

where the reactants of step 1 are N-hydroxysuccinimide (NHS) in the presence of 1-ethyl-3-(3-dimethylaminopropyl) carbodiimide hydrochloride (EDC) and water, whereas the reactants of step 2 are the appropriate peptide sequence protected on certain functions, in the presence of diisopropylethylamine (DIEA) and water, for the grafting of said peptide sequence, and trifluoroacetic acid (TFA) in the presence of water and triisopropylsilane (TIS), for the deprotection of the protected functions of the peptide sequence.

In the present case, the protected peptide sequence corresponds to the following formula: H-Asp(OtBu)-His(Trt)-Lys (Boc)-OH, or the following structural formula:

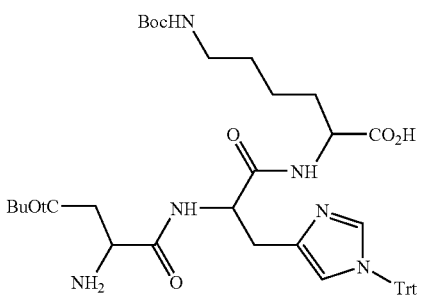

Prior to the implementation of the steps labelled 1 and 2 above, the protected peptide sequence is prepared, as illustrated by the formula above.

The protocol for preparing the protected peptide sequence is given below.

The amino acids required for the preparation of this peptide sequence are as follows:

H-Lys(Boc)-2-chlorotrityl resin of the following formula:

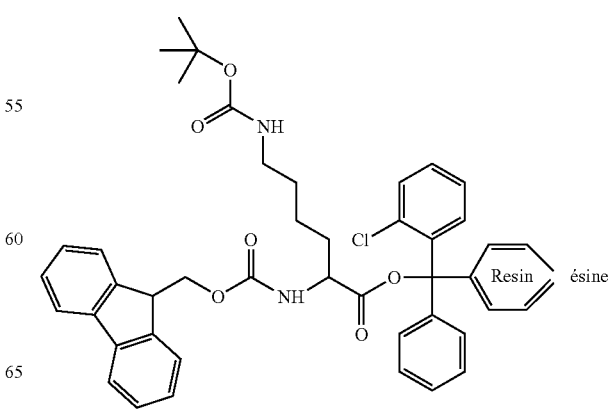

ésine

Fmoc-His(Trt) of the following formula:

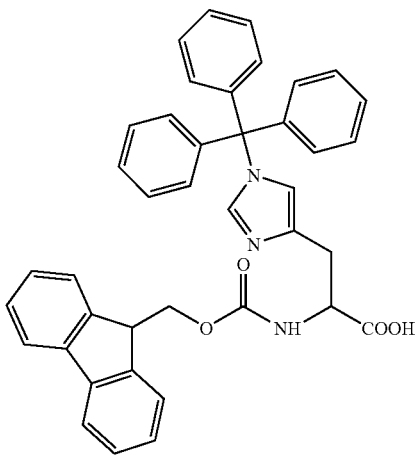 [SMILES: O=C(NC(Cc1cn(C(c2ccccc2)(c2ccccc2)c2ccccc2)cn1)C(=O)O)OCC1c2ccccc2-c2ccccc21]

Fmoc-Asp(OtBu) of the following formula:

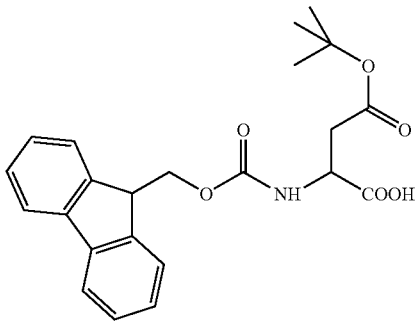 [SMILES: CC(C)(C)OC(=O)CC(NC(=O)OCC1c2ccccc2-c2ccccc21)C(=O)O]

0.5 g of H-Lys(Boc)-2-chlorotrityl resin (0.25 mmol) is coupled with the following amino acids (Fmoc-His(Trt), Fmoc-Asp(OtBu)), said amino acids being present in excess (10 parts) and with the —COOH functions in the form of the N-hydroxybenzotriazole ester, in the presence of HBTU and DIEA. The resulting peptide resin is placed in a syringe body comprising a fritted filter. A solution of 1% of TFA in dry dichloromethane is added. The mixture is left to act for two minutes and the resulting solution is filtered. The step of TFA reaction followed by filtration is repeated 10 times. The residual protected peptide sequence is washed in order to separate it from the resin with, in succession, 3×30 ml of dichloromethane, 3×30 ml of methanol, 2×30 ml of dichloromethane and 3×30 ml of methanol. All of the filtrates are combined and evaporated under reduced pressure to 5% of their volume. 40 ml of cold water are added and a white precipitate appears. The product is isolated by filtration and washed three times with cold water.

The functionalized polypyrrole copolymer is produced in a two-compartment cell on a polycarbonate support matrix. The carboxylated polypyrrole base copolymer is deposited on the polycarbonate support matrix.

EDC (0.08 M) and NHS (0.16 M) are dissolved in an aqueous medium. The two compartments of the cell are filled with 10 ml of the solution and the mixture is cooled at 4° C. After stirring at this temperature for one hour, the reaction mixture is stirred at ambient temperature for 3 hours. The activated membrane is washed twice with distilled water. The peptide sequence prepared beforehand (15.9 mg; 0.02 mmol) and DIEA (173.9 µl, 1 mmol) are dissolved in an aqueous medium and added to the two compartments. The resulting solution is stirred at ambient temperature for 12 hours. The membrane is washed with water and dried and a solution of TFA/H$_2$O/TIS (9.5:0.25:0.25) is added to the compartments. After 3 hours at ambient temperature, the TFA solution is removed and aqueous sodium hydroxide solution (2N) is added. After 2 hours at 80° C., the final membrane, removed from the polycarbonate matrix, is washed again with fresh water and dried carefully at ambient temperature.

EXAMPLE 7

This example illustrates the preparation of a membrane composed of a polypyrrole backbone and grafts of the following formula:

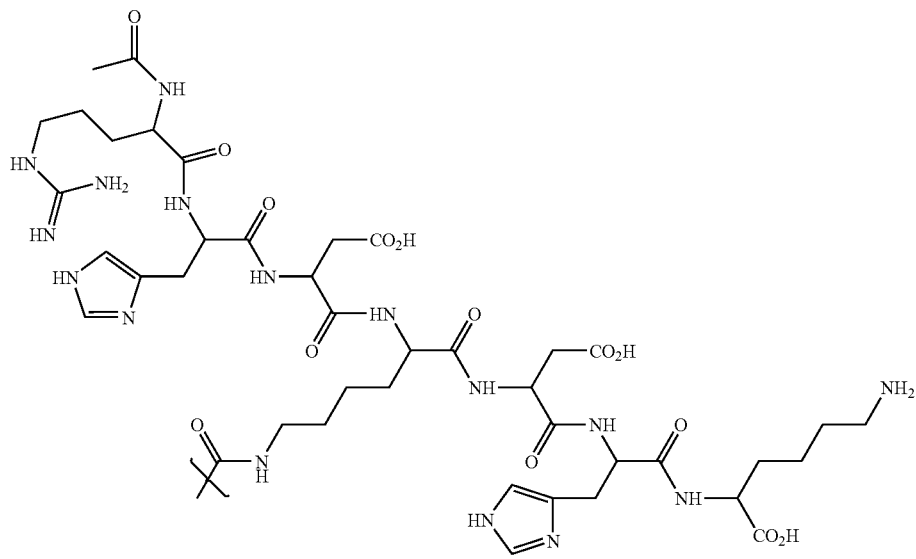

(VI)

where this group is represented hereinafter by the prefix —R.

The copolymer prepared in this example thus comprises the following sequence of units:

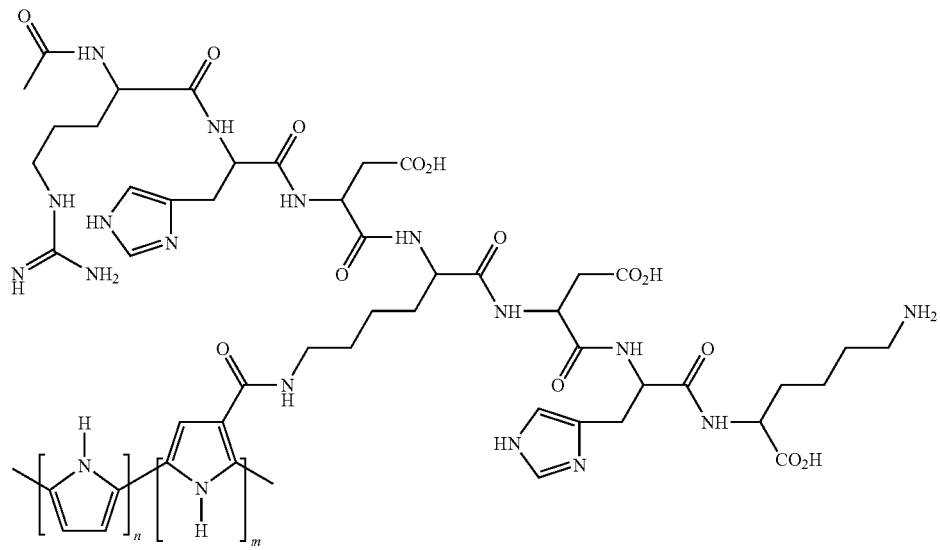

where n and m indicate the number of repeating units of the unit between square brackets.

To prepare this copolymer, the reaction scheme is as follows:

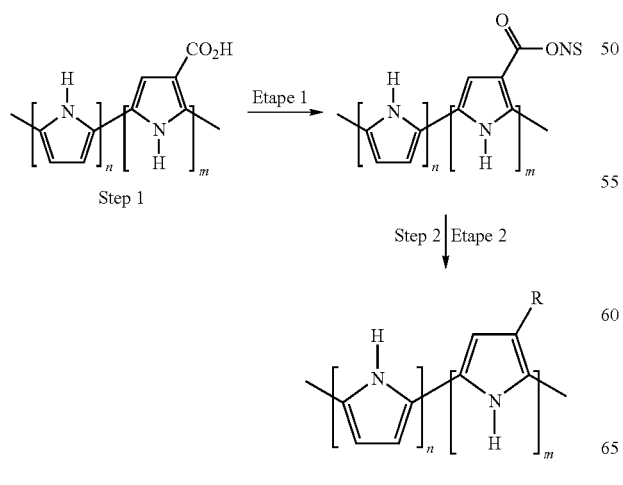

where the reactants of step 1 are N-hydroxysuccinimide (NHS) in the presence of 1-ethyl-3-(3-dimethylaminopropyl) carbodiimide hydrochloride (EDC) and water, whereas the reactants of step 2 are the appropriate peptide sequence protected on certain functions, in the presence of diisopropylethylamine (DIEA) and water, for the grafting of said peptide sequence, and trifluoroacetic acid (TFA) in the presence of water and triisopropylsilane (TIS), for the deprotection of the protected functions of the peptide sequence.

In the present case, the protected peptide sequence corresponds to the following formula:

Ac-Arg(Pbf)-His(Trt)-Asp(OtBu)-Lys-Asp(OtBu)-His(Trt)-Lys(Boc)-OH, the structural formula of this protected peptide sequence being as follows:

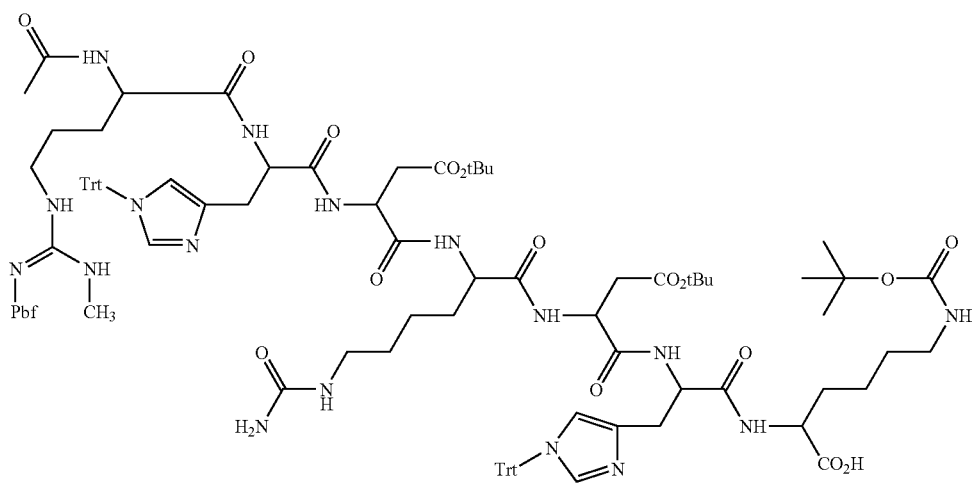

Prior to the implementation of the steps labelled 1 and 2 above, the protected peptide sequence is prepared, as illustrated by the formula above.

The protocol for preparing the protected peptide sequence is given below.

The amino acids required for the preparation of this peptide sequence are as follows:

H-Lys(Boc)-2-chlorotrityl resin of the following formula:

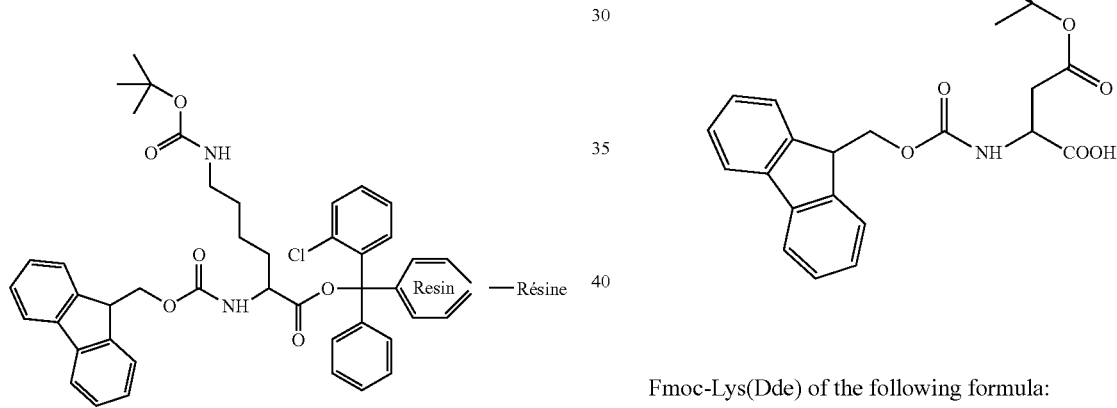

Fmoc-His(Trt) of the following formula:

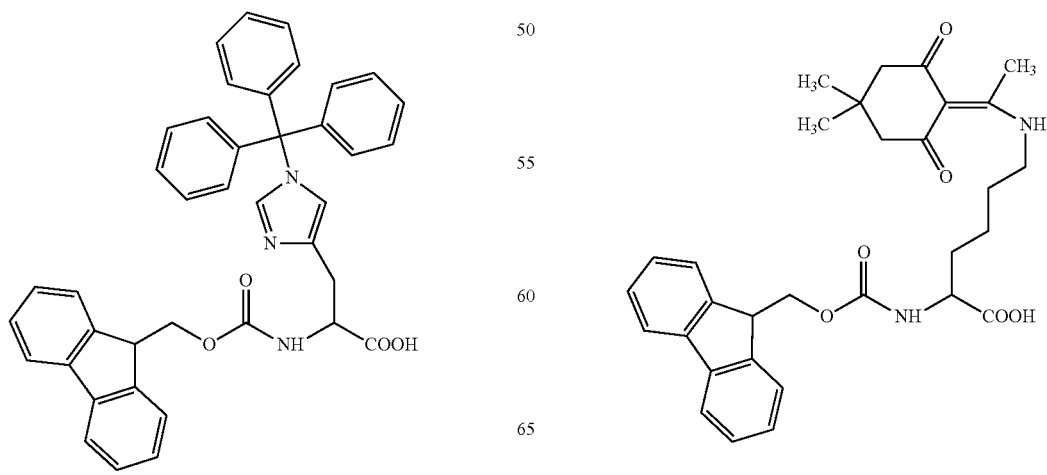

Fmoc-Asp(OtBu) of the following formula:

Fmoc-Lys(Dde) of the following formula:

Fmoc-Arg(Pbf) of the following formula:

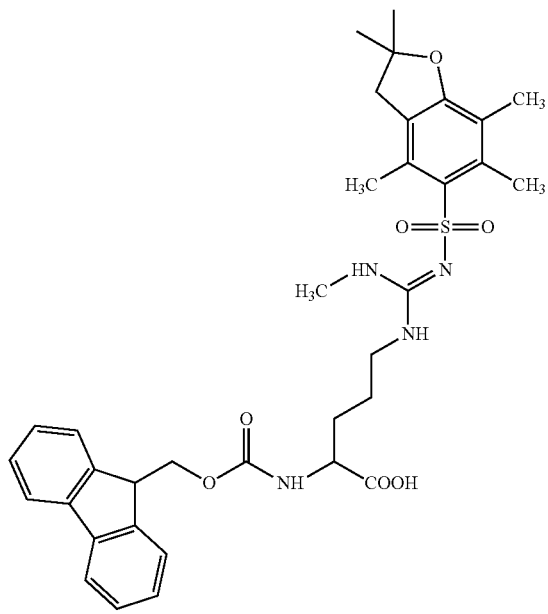 [SMILES: CN/C(=N\S(=O)(=O)c1c(C)c(C)c2c(c1C)CC(C)(C)O2)NCCCC(NC(=O)OCC1c2ccccc2-c2ccccc21)C(=O)O]

0.5 g of H-Lys(Boc)-2-chlorotrityl resin (0.25 mmol) is coupled with the following amino acids (Fmoc-His(Trt), Fmoc-Asp(OtBu), Fmoc-Lys(Dde), Fmoc-Asp(OtBu), Fmoc-His(Trt), Fmoc-Arg(Pbf)), said amino acids being present in excess (10 parts) and with the —COOH functions in the form of the N-hydroxybenzotriazole ester, in the presence of N-[(1H-(benzotriazol-1-yl)-dimethylamino)methylene]-N-methylmethanaminium hexafluorophosphate (HBTU) and diisopropylethylamine (DIEA). The resulting peptide resin is placed in a syringe body comprising a fitted filter.

In parallel, AcOH (14.2 μl, 0.25 mmol), HOBt (33.7 mg, 0.25 mol) and PyBOP (130 mg, 0.25 mmol) are dissolved in DMF (5 ml). An excess of DIEA (100 μl, 0.57 mmol) is added and the reaction mixture is stirred at ambient temperature for 4 hours. The resulting solution is added to the peptide resin prepared above and is stirred at ambient temperature for 12 hours. The resin is washed with 3×30 ml of dichloromethane, 3×30 ml of methanol and 2×30 ml of dichloromethane. A Kaiser test is carried out, indicating that no primary amine at all is detected.

The resulting resin is resuspended in a solution of 2% hydrazine monohydrate in dichloromethane (20 ml/g of resin). It is left to react for 3 minutes, with careful manual stirring, and the hydrazine treatment is repeated twice in order to ensure complete reaction. The resin is washed in succession with 2×20 ml of dimethylformamide, 2×20 ml of dichloromethane, 20 ml of methanol and 20 ml of dichloromethane and dried.

A solution of 1% of trifluoroacetic acid in dry dichloromethane is added. The mixture is left to react for 2 minutes and the resulting solution is filtered. This step is repeated 10 times. The residual protected peptide sequence is separated from the resin by washing with 3×30 ml of dichloromethane, 3×30 ml of methanol, 2×30 ml of dichloromethane and 3×30 ml of methanol. All of the filtrates are combined and evaporated under reduced pressure to 5% of their volume. 40 ml of cold water are added and a white precipitate appears. The product is isolated by filtration and washed three times with cold water.

The functionalized polypyrrole copolymer is produced in a two-compartment cell on a polycarbonate support matrix. The carboxylated polypyrrole base copolymer is deposited on the polycarbonate support matrix.

1-Ethyl-3-(3-dimethylaminopropyl)carbodiimide hydrochloride (EDC) (0.08 M) and N-hydroxysuccinimide (NHS) (0.16 M) are dissolved in an aqueous medium. The two compartments of the cell are filled with 10 ml of the solution and the mixture is cooled at 4° C. After stirring at this temperature for one hour, the reaction mixture is stirred at ambient temperature for 3 hours. The activated membrane is washed twice with distilled water. The peptide sequence prepared beforehand (15.9 mg; 0.02 mmol) and diisopropylethylamine (173.9 μl, 1 mmol) are dissolved in an aqueous medium and added to the two compartments. The resulting solution is stirred at ambient temperature for 12 hours. The membrane is washed with water and dried and a solution of $TFA/H_2O/TIS$ (9.5:0.25:0.25) is added to the compartments. After 3 hours at ambient temperature, the TFA solution is removed and aqueous sodium hydroxide solution (2N) is added.

After 2 hours at 80° C., the final membrane, removed from the polycarbonate matrix, is washed again with fresh water and dried carefully at ambient temperature.

The invention claimed is:

1. A fuel cell device comprising at least one membrane comprising a graft (co)polymer comprising a main chain and grafts bonded covalently to said main chain, each of said grafts comprising both (1) at least one proton acceptor group and (2) at least one proton donor group, said grafts corresponding to amino acid residues or peptide sequences.

2. The fuel cell device according to claim 1, wherein the proton acceptor group contains an atom bearing a lone pair and/or is negatively charged.

3. The fuel cell device according to claim 2, wherein the proton acceptor group containing an atom bearing a lone pair is an amine group.

4. The fuel cell device according to claim 3, wherein the amine group is a primary amine group —$NH_2$ or a secondary amine group —NH—.

5. The fuel cell device according to claim 4, wherein the secondary amine group —NH— is included in a linear hydrocarbon chain or is contained in an imidazole group or a guanidine group.

6. The fuel cell device according to claim 2, wherein the negatively charged proton acceptor group is an —$O^-$ or —$S^-$ function, or a salt of carboxylic acid —$CO_2H$, of sulphonic acid —$SO_3H$ or of phosphonic acid —$PO_3H_2$.

7. The fuel cell device according to claim 1, wherein the proton donor group is an —OH or —SH group, an acid group —$CO_2H$, —$SO_3H$ or —$PO_3H_2$, or a salt of amine group.

8. The fuel cell device according to claim 1, wherein the grafts correspond to saturated or unsaturated, cyclic or acyclic hydrocarbon groups which may contain one or more heteroatoms such as O, N and S and are optionally substituted.

9. The fuel cell device according to claim 1, wherein the grafts correspond to amino acid residues.

10. The fuel cell device according to claim 9, wherein the amino acid residues are obtained from natural α-amino acids selected from arginine, asparagine, aspartic acid, glutamic acid, glutamine, histidine and lysine.

11. The fuel cell device according to claim 9, wherein the amino acid residues are lysine, arginine and histidine residues of formulae (I) to (III) below:

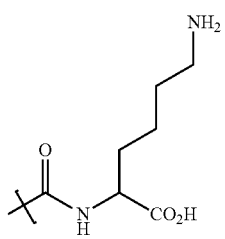
(I)

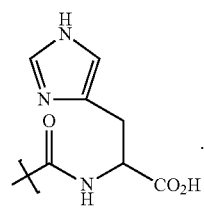
(II)

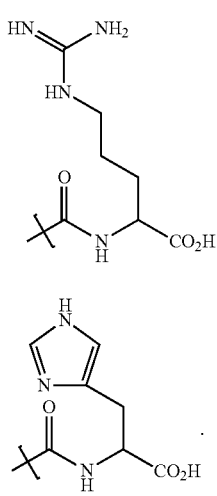
(III)

12. The fuel cell device according to claim 9, wherein the amino acid residues are obtained from amino acids selected from:

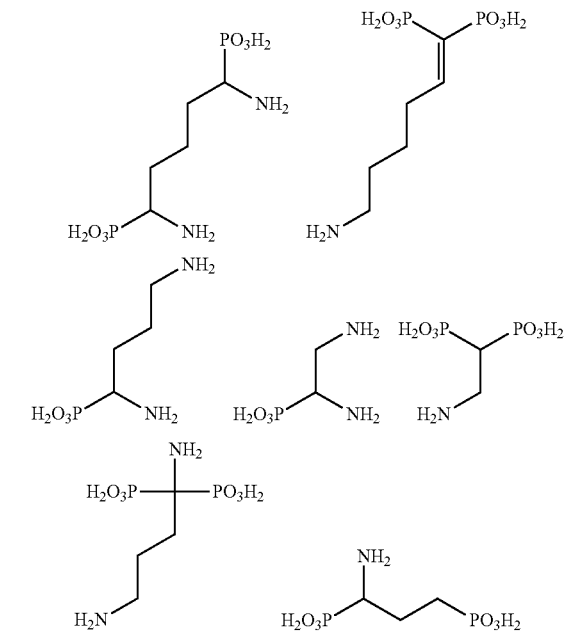

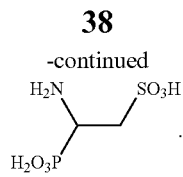

13. The fuel cell device according to claim 1, further comprising grafts corresponding to amino acid residues or peptide sequences, each of which (1) does not comprise at least one proton acceptor group and/or (2) does not comprise at least one proton donor group.

14. The fuel cell device according to claim 13, wherein the grafts as defined in claim 13 are amino acid residues obtained from amino acids selected from cysteine, proline, serine, threonine, tyrosine, residues of non-natural amino acids selected from the amino acids of the following formulae:

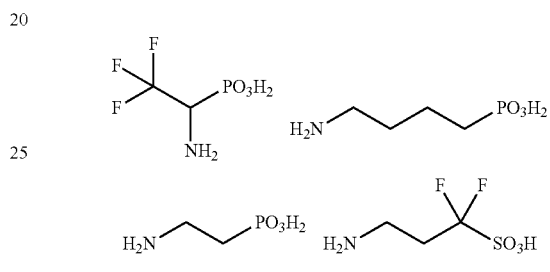

or else residues of compounds of the following formulae:

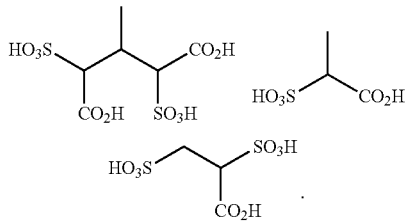

15. The fuel cell device according to claim 13, wherein the grafts correspond to the amino acid residue of formula (IV) below:

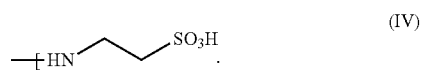
(IV)

16. The fuel cell device according to claim 1, wherein the grafts correspond to peptide sequences.

17. The fuel cell device according to claim 16, wherein the peptide sequences consist of a concatenation of amino acids which are natural α-amino acids selected from arginine, asparagine, aspartic acid, glutamic acid, glutamine, histidine and lysine.

18. The fuel cell device according to claim 16, wherein the grafts conform to one of the following formulae:

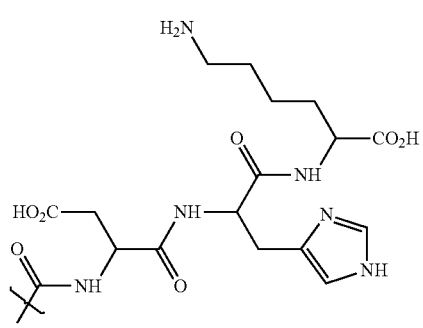
(V)

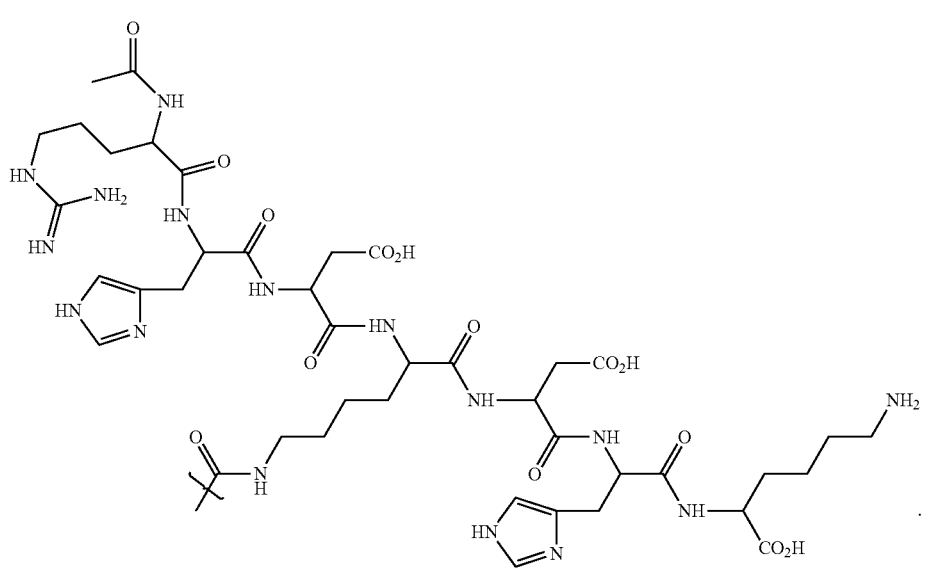
(VI)

19. The fuel cell device according to claim 1, wherein the main chain corresponds to an aliphatic or aromatic hydrocarbon chain optionally comprising one or more heteroatoms, such as O, N, S, a halogen atom.

20. The fuel cell device according to claim 19, wherein the main chain comprises a heterocyclic repeating unit to which, wholly or partly, grafts are covalently bonded.

21. The fuel cell device according to claim 20, wherein the main chain is a polypyrrole chain.

22. The fuel cell device according to claim 21, selected from the following membranes:

a membrane composed of a graft copolymer comprising a polypyrrole backbone and grafts of formula (I) to (III) below:

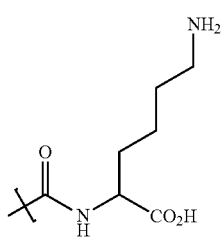
(I)

-continued

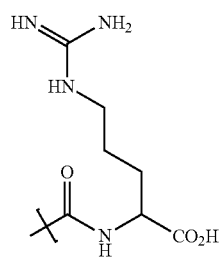
(II)

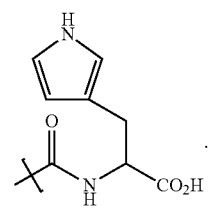
(III)

23. The fuel cell device according to claim 1, wherein the membrane consists of said graft (co)polymer.

24. The fuel cell device according to claim 1, comprising a polymeric support matrix comprising through-pores, said pores being filled in by a graft (co)polymer.

25. The fuel cell device according to claim 24, wherein the polymeric support matrix is made of a polymer selected from polyurethanes, polyolefins, polycarbonates, polyethylene terephthalates, these polymers being optionally fluorinated.

26. Method for preparing a according to claim 23, wherein the graft (co)polymer is prepared by reacting a base (co)polymer comprising pendant functions X with at least one graft precursor comprising a function A capable of reacting with a pendant function X to form a covalent bond, the grafts, at the outcome of said reaction, being bonded to the base copolymer.

27. Preparation method according to claim 26, wherein the pendant functions X are carboxyl functions —CO$_2$H and the functions A are amine functions —NH$_2$.

28. Preparation method according to claim 26, comprising, when the membranes are composed of a copolymer comprising a polypyrrole backbone and grafts consisting of amino acid residues or peptide sequences, a step of reacting a base copolymer in which the backbone comprises at least one repeating unit of the following formula:

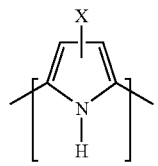

and optionally a repeating unit of the following formula:

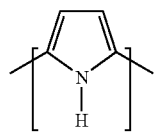

with at least one amino acid or peptide sequence comprising a function A.

29. Method for preparing a proton-conducting membrane as defined in claim 23, comprising a step of polymerising at least one monomer bearing at least one side chain.

* * * * *